US008509183B2

(12) United States Patent  (10) Patent No.: US 8,509,183 B2
Kim et al.  (45) Date of Patent: Aug. 13, 2013

(54) METHOD FOR EVOLVED MULTIMEDIA BROADCAST/MULTICAST SERVICE

(75) Inventors: Dae Ik Kim, Daejeon (KR); Jee Hyeon Na, Seoul (KR); Sang Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 639 days.

(21) Appl. No.: 12/618,836

(22) Filed: Nov. 16, 2009

(65) Prior Publication Data

US 2010/0159933 A1  Jun. 24, 2010

(30) Foreign Application Priority Data

Dec. 19, 2008 (KR) .................. 10-2008-0130477

(51) Int. Cl.
 H04B 1/44 (2006.01)
 H04W 4/00 (2009.01)
 H04W 36/00 (2009.01)
 H04J 3/24 (2006.01)

(52) U.S. Cl.
 USPC ............ 370/331; 370/282; 370/474; 455/436

(58) Field of Classification Search
 USPC ................. 370/282, 328, 329, 331, 432, 437, 370/447, 474–476; 455/432.1, 434, 436, 455/439, 442, 450
 See application file for complete search history.

(56) References Cited

U.S. PATENT DOCUMENTS

| 7,421,272 | B2 | 9/2008 | Dalsgaard et al. | |
| 2004/0202140 | A1* | 10/2004 | Kim et al. | 370/335 |
| 2005/0007971 | A1* | 1/2005 | Jeong et al. | 370/312 |
| 2005/0111393 | A1* | 5/2005 | Jeong et al. | 370/312 |
| 2006/0072516 | A1* | 4/2006 | Jeong et al. | 370/335 |
| 2006/0146745 | A1* | 7/2006 | Cai et al. | 370/328 |

(Continued)

FOREIGN PATENT DOCUMENTS

| EP | 1 467 586 A2 | 10/2004 |
| EP | 1 850 616 A1 | 10/2007 |

(Continued)

OTHER PUBLICATIONS

Communication pursuant to Article 94(3) EPC dated Feb. 13, 2012.

(Continued)

*Primary Examiner* — Michael Thier
*Assistant Examiner* — Redentor Pasia
(74) *Attorney, Agent, or Firm* — Kile Park Reed & Houtteman PLLC

(57) ABSTRACT

According to an Evolved Multimedia Broadcast Multicast Service (E-MBMS) service method of the present invention, an E-MBMS service is received from a first base station. If neighbor cell MBMS control information is modified in the first base station, MBMS paging information, including a factor informing that the neighbor cell MBMS control information has been modified, is received from the first base station. When an MBMS control information update cycle is reached, modified neighbor cell MBMS control information is received from the first base station and is stored. When a user equipment moves from the first base station to a second base station, a P-T-M radio bearer is reset based on the stored neighbor cell MBMS control information and receiving the E-MBMS service from the second base station. Accordingly, the consumption of battery power can be reduced, and an E-MBMS service being services is not interrupted although a user equipment moves.

7 Claims, 3 Drawing Sheets

(56) References Cited

U.S. PATENT DOCUMENTS

| | | | |
|---|---|---|---|
| 2007/0264992 A1 | 11/2007 | Maenpaa | |
| 2008/0273503 A1* | 11/2008 | Lee et al. | 370/336 |
| 2008/0287129 A1* | 11/2008 | Somasundaram et al. | 455/436 |
| 2009/0022080 A1* | 1/2009 | Edlund et al. | 370/315 |
| 2010/0061308 A1* | 3/2010 | Becker et al. | 370/328 |

FOREIGN PATENT DOCUMENTS

| | | |
|---|---|---|
| KR | 10-2006-0132936 A | 12/2006 |
| KR | 10-2007-0030317 A | 3/2007 |
| KR | 10-2007-0052347 A | 5/2007 |
| WO | 2007/040300 A1 | 4/2007 |

OTHER PUBLICATIONS

3GPP: "3GPP TS 43.246 v8.0.0 "3rd Generation partnership Project; Technical Specification Group GSM/EDGE Radio Access Network; Multimedia Broadcast Multicast Service (MBMS) in the GERAN; Stage 2(Release 8)"" 3GPP Dec. 18, 2008, pp. 1-34, XP002570865.

Samsung: "R2-040068 MBMS common paging Versus MBMS dedicated paging" 3GPP Jan. 16, 2004, pp. 1-6, XP002570870.

European Search Report dated Mar. 16, 2010 issued in European patent appl. No. 09174442.5.

* cited by examiner

METHOD FOR EVOLVED MULTIMEDIA BROADCAST/MULTICAST SERVICE

CROSS-REFERENCE TO RELATED APPLICATION

This application claims the benefit of Korean Application No. 10-2008-0130477, filed Dec. 19, 2008 in the Korean Intellectual Property Office, the disclosure of which is incorporated herein by reference.

BACKGROUND OF THE INVENTION

1. Field of the Invention

The present invention relates to an Evolved Multimedia Broadcast Multicast Service (E-MBMS) service method and, more particularly, to an E-MBMS service method in which, in a current cell where MBMS control information is cyclically transmitted, a user equipment can receive MBMS control information of a neighbor cell only when the MBMS control information of a neighbor cell is modified.

2. Discussion of the Related Art

In Evolved-Universal Terrestrial Radio Access (E-UTRAN) of a Long Term Evolution (LTE)-Advanced system, only evolved-NB (eNB) in which the function of a Radio Network Controller (RNC) and the function of a base station such as a Node B (NB) in UTRAN are integrated is defined. An eNB cannot supply a user equipment with MBMS radio resource information about neighbor cells because it allocates MBMS radio resources to only cells covered by the eNB. Further, the eNB may not use soft combining or selective combining technologies which can be obtained using a soft handover characteristic based on Wideband Code Division Multiple Access (WCDMA) technology, because of a hard handover characteristic based on Orthogonal Frequency Division Multiple Access (OFDMA) technology.

Accordingly, if a user equipment that receives an Evolved-MBMS (E-MBMS) in an LTE-Advanced system moves to another cell, a problem in which an E-MBMS service is interrupted may happen. In particular, if a cell is changed in a Radio Resource Control (RRC)-IDLE state without a wireless connection between an eNB and the user equipment, the user equipment has to be synchronized with the changed cell, receive system information, and then receive MBMS control information based on the received system information. Accordingly, there is a probability that an E-MBMS service may be interrupted for a long time. If the transmission cycle of MBMS control information is not sufficiently short, a problem that an E-MBMS service is interrupted irrespective of a radio access mode of the user equipment may happen.

Accordingly, there is a need for a scheme in which a user equipment can receive the MBMS control information of a neighbor cell only when the MBMS radio resource information of the neighbor cell is modified so that the consumption of battery power can be minimized and an E-MBMS service is not interrupted even when the user equipment moves between cells.

SUMMARY OF THE INVENTION

In accordance with an embodiment of the present invention, there is provided an E-MBMS service method, including receiving an E-MBMS service from a first base station, if neighbor cell MBMS control information is modified in the first base station, receiving MBMS paging information including a factor, informing that the neighbor cell MBMS control information has been modified, from the first base station, when an MBMS control information update cycle is reached, receiving modified neighbor cell MBMS control information from the first base station and stores the modified neighbor cell MBMS control information, and when a user equipment moves from the first base station to a second base station, resetting a P-T-M radio bearer based on the stored neighbor cell MBMS control information and receiving the E-MBMS service from the second base station.

BRIEF DESCRIPTION OF THE DRAWINGS

The above and other objects and features of the present invention will become apparent from the following description of some embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art. In describing the embodiments of the present invention, the same reference numbers are used throughout the drawings to refer to the same parts, and redundant descriptions thereof are omitted.

Figure 1:
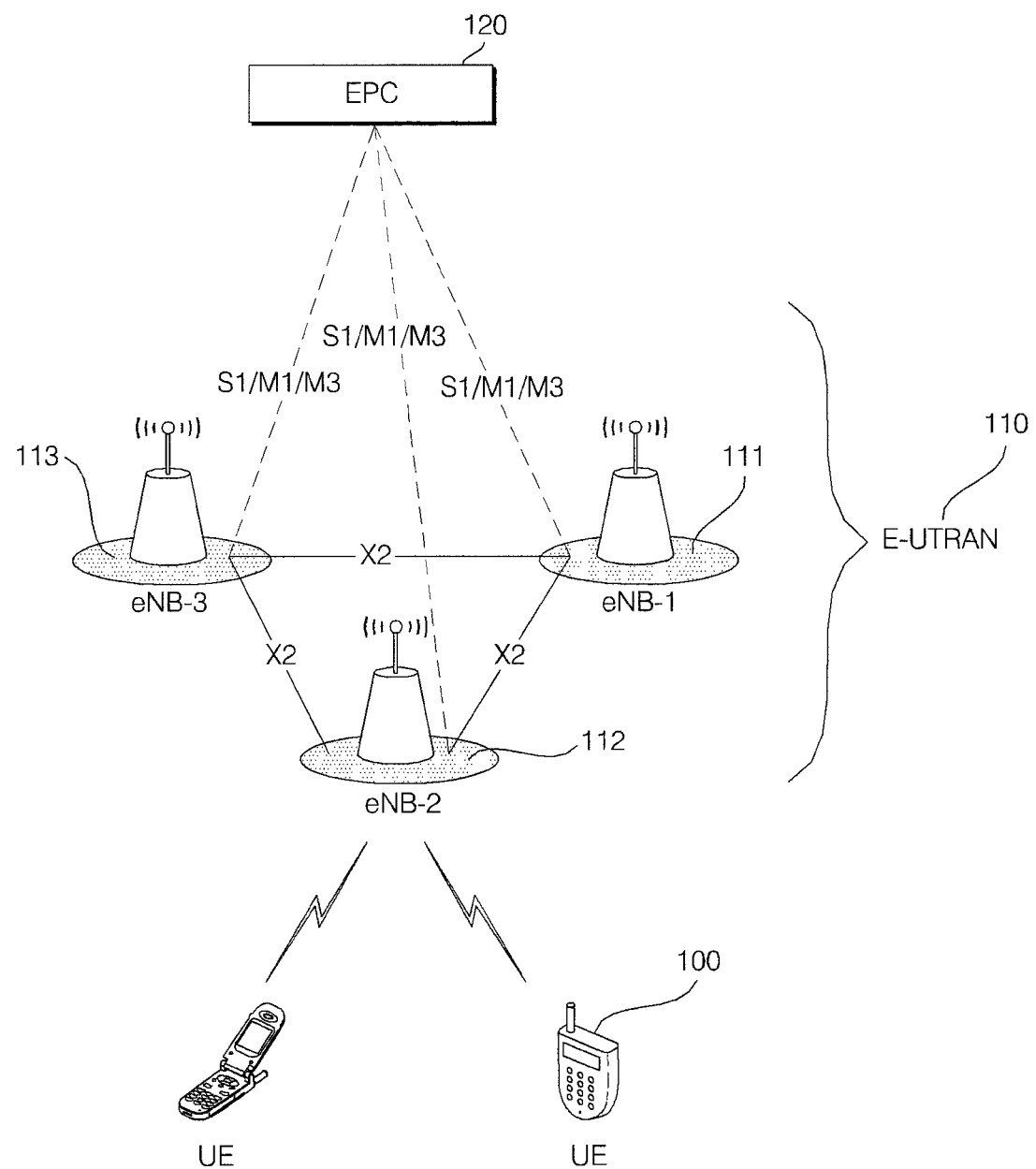
FIG. 1 is a configuration showing an LTE-Advanced system applied to an E-MBMS service method according to an embodiment of the present invention.

FIG. 1 is a configuration showing an LTE-Advanced system applied to an E-MBMS service method according to an embodiment of the present invention.

As shown in FIG. 1, the LTE-Advanced system includes user equipments (UE) 100, an E-UTRAN 110, and an Evolved Packet Core (EPC) 120. The E-UTRAN 102 includes a plurality of eNBs 111, 112, and 113. In the LTE-Advanced system, an E-MBMS service can be provided.

The user equipment 100 accesses the eNB 111 through a radio channel and receives a wireless packet data service from the eNB 111.

The eNBs 111, 112, and 113 connect a wired network and a wireless network and control a radio channel. The eNBs 111, 112, and 113 can directly supply the user equipment 100 with a wireless packet data service. The E-UTRAN 110 includes only the eNBs 111, 112, and 113 unlike UTRAN comprising only a Radio Network Controller (RNC) and a node B. The eNBs 111, 112, and 113 function to directly allocate radio sources to cells, covered by the respective eNBs 111, 112, and 113, and to manage the cells. The eNBs 111, 112, and 113 communicate with each other through an X2 interface in order to support the mobility of the user equipment 100, communicate with the EPC 120 through an S1 interface in order to provide a basic call service, and communicate with the EPC 120 through M1/M3 interfaces in order to supply an E-MBMS service.

The EPC 120 is a set of network nodes which is capable of performing a network access control function, a packet routing and transmission function, a mobility management function, a security function, an E-MBMS providing function, and so on.

Figure 2:
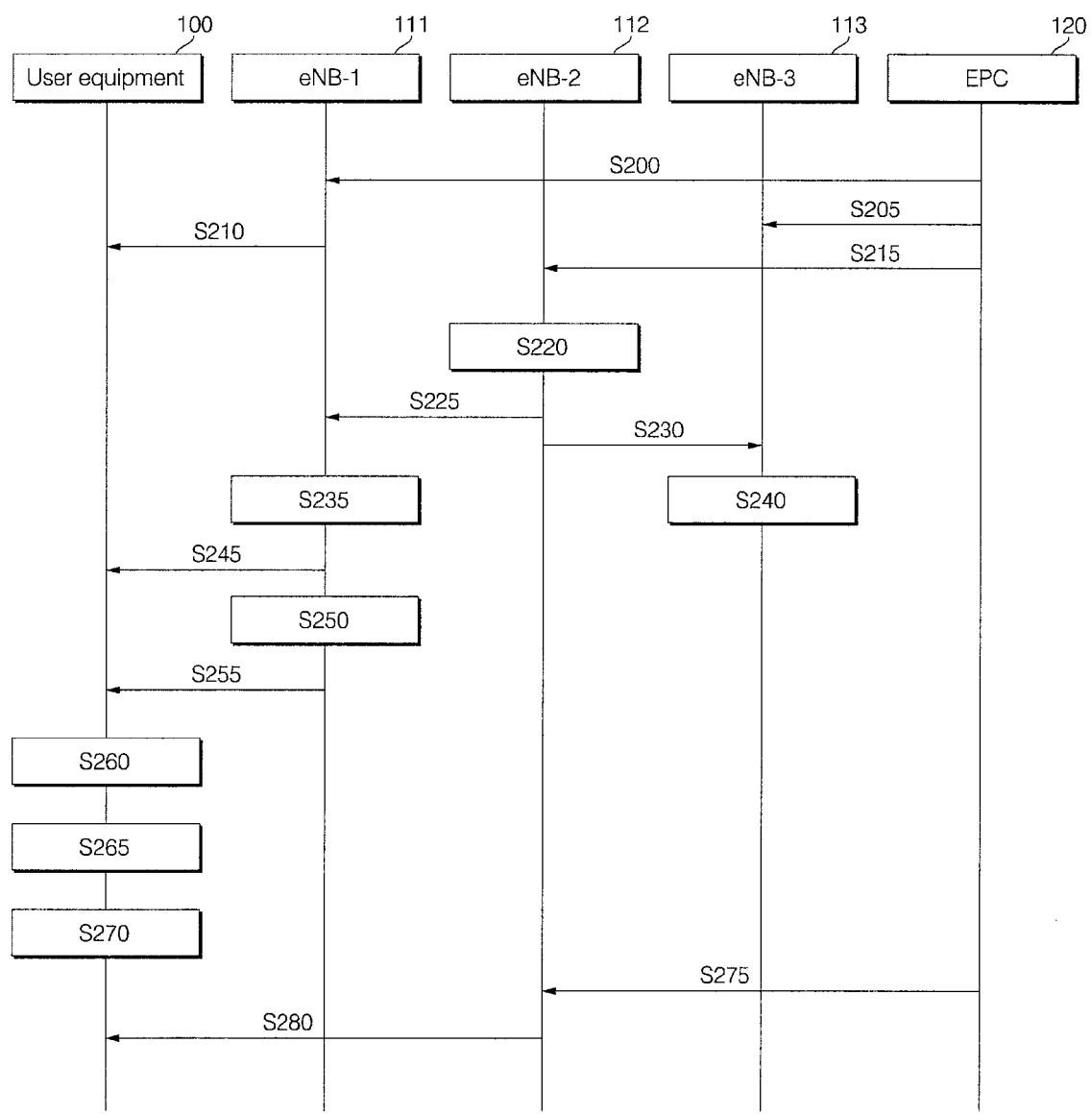
FIG. 2 is a flowchart showing an E-MBMS service method according to an embodiment of the present invention.

FIG. 2 is a flowchart showing an E-MBMS service method according to an embodiment of the present invention.

As shown in FIG. 2, the EPC 120 transmits an E-MBMS service to each of the eNB-1 111 and the eNB-3 113 (S200 and S205). The user equipment 100, included in the cell of the eNB-1 111, receives the E-MBMS service from the EPC 120 via the eNB-1 111 (S210).

The EPC 120 informs the eNB-2 112 of a session start (S215). After the E-MBMS service is received, the eNB-2 112 modifies MBMS control information in order to transmit the E-MBMS service to the user equipment 100 (S220). Here, the MBMS control information includes MBMS modified services information, MBMS unmodified services information, and MBMS current cell P-T-M RB information. The MBMS control information may be modified at any time according to the start, change, or termination of an E-MBMS service session.

The eNB-2 112 configures new MBMS control information (i.e., MBMS P-T-M RB information) based on an MBMS transmission identity in order to inform neighbor cells that the MBMS control information has been modified, and transmits the new MBMS control information to each of the neighbor cells (i.e., the eNB-1 111 and the eNB-3 113) (S225 and S230).

Each of the eNB-1 111 and the eNB-3 113 modifies neighbor cell MBMS control information (i.e., MBMS neighbor cell P-T-M RB information), which belongs to the MBMS control information, based on the MBMS P-T-M RB information received at steps S225 and S230 (S235 and S240). Here, the MBMS neighbor cell P-T-M RB information includes only P-T-M RB information about E-MBMS service which is serviced both in a current cell and neighbor cells. Further, the eNB-1 111 and the eNB-3 113 modify MBMS control information so that a factor, indicating that MBMS neighbor cell P-T-M RB information has been modified, is included in MBMS modified services information. The user equipment 100 can acquire information, indicating that the MBMS neighbor cell P-T-M RB information has been modified, using the MBMS modified services information. The modification of the MBMS neighbor cell P-T-M RB information, performed at steps S235 and S240, may be executed whenever P-T-M RB information is modified according to the start, change, or termination of an E-MBMS session.

The eNB-1 111 transmits MBMS paging information including the factor, indicating that the MBMS neighbor cell P-T-M RB information has been modified, to the user equipment 100 (S245).

When the update cycle of the MBMS control information is reached (S250), the user equipment 100 that has received the MBMS paging information receives the MBMS control information from the eNB-1 111 (S255). The user equipment 100 that has received the MBMS control information from the eNB-1 111 stores the MBMS neighbor cell P-T-M RB information in order to prevent services from being interrupted when a cell is changed (S260).

If handover is generated in a Radio Resource Control (RRC)-Connected state or reselection of a cell is generated in an RRC-Idle state because the user equipment 100 has moved to the cell area of the eNB-2 112 (S265), the user equipment 100 checks P-T-M RB information about an E-MBMS service which is now being serviced based on the MBMS neighbor cell P-T-M RB information acquired from the eNB-1 111 and resets a P-T-M radio bearer (S270). Accordingly, the user equipment 100 can receive an E-MBMS service 274 from the EPC 120 via the eNB-2 112 without interruption (S280). Accordingly, in the case where the user equipment 100 moves from the cell area of the eNB-1 111 to the cell area of the eNB-2 112 where the same E-MBMS service as that provided by the eNB-1 111 is provided, the user equipment 100 resets a P-T-M radio bearer without newly acquiring MBMS control information. Accordingly, the interruption of services is not generated, and the consumption of battery power can be minimized.

Figure 3:
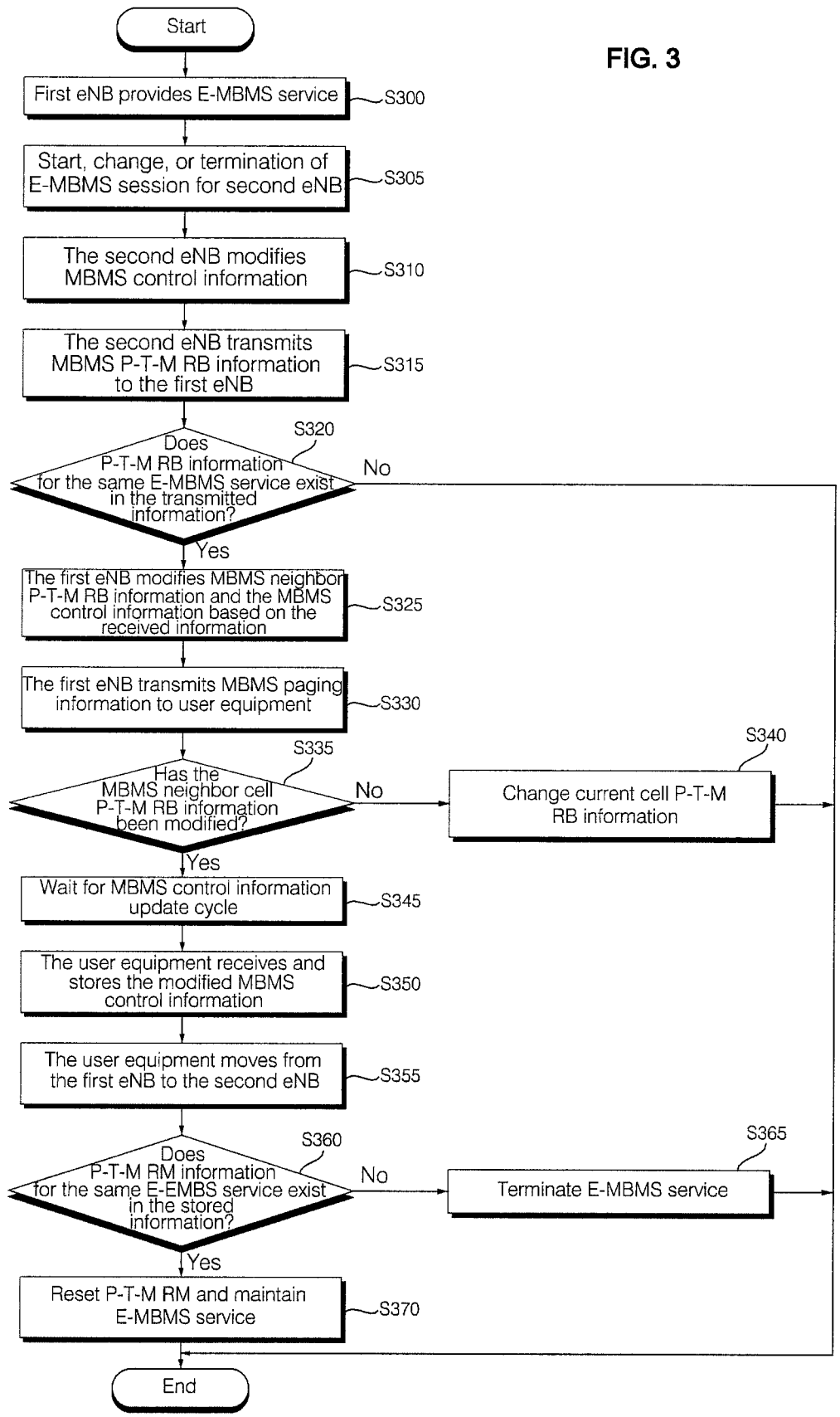
FIG. 3 is another flowchart showing an E-MBMS service method according to an embodiment of the present invention.

FIG. 3 is another flowchart showing an E-MBMS service method according to an embodiment of the present invention.

Referring to FIG. 3, first, a specific E-MBMS service is provided to the user equipment through a first eNB (S300). If the start, change, or termination of an E-MBMS session for the second eNB is generated (S305), a second eNB modifies MBMS modified services information, MBMS unmodified services information, and MBMS current cell P-T-M RB information which belong to MBMS control information (S310). In order to inform neighbor cells that the MBMS control information has been modified, the second eNB newly configures MBMS P-T-M RB information on the basis of an MBMS transmission identity and transmits the newly configured MBMS P-T-M RB information to the first eNB (S315).

The first eNB determines whether P-T-M RB information about the same service as the E-MBMS service, supplied at step S300, is included in the MBMS P-T-M RB information received at step S315 (S320). If, as a result of the determination at step S320, the P-T-M RB information about the same service as the E-MBMS service is determined not to be included in the MBMS P-T-M RB information, the procedure of performing the service method of the present invention is terminated.

Meanwhile, if, as a result of the determination at step S320, the P-T-M RB information about the same service as the E-MBMS service is determined to be included in the MBMS P-T-M RB information, the first eNB modifies the MBMS neighbor cell P-T-M RB information based on the received MBMS P-T-M RB information and modifies the MBMS control information so that a factor, indicating that the MBMS neighbor cell P-T-M RB information has been modified, is included in the MBMS modified services information (S325).

The first eNB transmits the MBMS paging information to the user equipment (S330). MBMS paging information may include the factor indicating that the MBMS neighbor cell P-T-M RB information has been modified.

In the case where the user equipment that is receiving the E-MBMS service via the first eNB receives the MBMS paging information according to step S330, the user equipment determines whether the MBMS neighbor cell P-T-M RB information has been modified based on the received MBMS paging information (S335). If, as a result of the determination at step S335, the MBMS neighbor cell P-T-M RB information is determined not to have been modified, the user equipment modifies the MBMS current cell P-T-M RB information and terminates the procedure (S340).

Meanwhile, if, as a result of the determination at step S335, the MBMS neighbor cell P-T-M RB information is determined to have been modified, the user equipment waits for an MBMS control information update cycle (S345).

When the MBMS control information update cycle is reached, the user equipment receives the MBMS control information, modified at step S325, from the first eNB and stores the received MBMS control information (S350).

If the user equipment moves from the first eNB to the second eNB (S355), the user equipment receives the system information of the changed cell (i.e., the second eNB) through a handover procedure in the case where the user equipment is RRC-connected. In this case, in the case where the user equipment is in an RRC-idle state, the user equipment is synchronized with the second eNB through reselection of a cell and receives the system information of the second eNB.

The user equipment determines whether P-T-M RB information for an E-MBMS service now being received is included in the MBMS control information stored at step S350 (S360). If, as a result of the determination at step S360, the P-T-M RB information for an E-MBMS service is determined not to be included in the MBMS control information, the E-MBMS service is terminated because the E-MBMS service now being received is not supplied by the second eNB (S365).

Meanwhile, if, as a result of the determination at step S360, the P-T-M RB information for an E-MBMS service is determined to be included in the MBMS control information, the user equipment reset a P-T-M radio bearer and maintains the E-MBMS service now being received (S370).

Tables 1 to 4 illustrate messages and information factors used in the E-MBMS service method according to an embodiment of the present invention.

Table 1 illustrates MBMS P-T-M RB information.

TABLE 1

MBMS P-T-M RB Informaiton

| Name | Need | Multi | Type/ Reference | Semantics description |
|---|---|---|---|---|
| MBMS P-T-M Rb Info | MP | 1 . . . n | | |
| > MTCH RNTI | MP | | INTEGER | RNTI for MBMS Traffic |
| > MBMS Rb Info List | MP | 1 . . . m | | List of MBMS RB Info |
| >> MRB Identity | MP | | <ref> | MBMS RB Identity |
| >> PDCP Configuration | OP | | <ref> | |
| >> RLC Configuration | OP | | <ref> | |
| >> MTCH Logical Channel Identity | OP | | INTERGER | |
| >> Logical Channel Config | OP | | <ref> | |
| >> MBMS Transmission Identity | MP | | | |
| >>> MBMS Service Identity | MP | | Octet String | |
| >>> PLMN Identity | MP | | Octet String | |
| >>> MBMS Session Identity | OP | | Octet String | |
| >> . . . | | | | |
| > MAC Main Config | OP | | <ref> | |
| > Physical Config Dedicated | OP | | <ref> | |
| > SPS Configuration | OP | | <ref> | Semi-Persistent Scheduling |
| > . . . | | | | |

The MBMS P-T-M RB information is a message exchanged between eNBs through an X2 interface. If the MBMS control information of a current cell is modified according to the start, change, or termination of an E-MBMS session, the MBMS P-T-M RB information may be used to inform neighbor cells of this modification. The MBMS P-T-M RB information may be configured on the basis of an MBMS transmission identity. MBMS modified services information and MBMS unmodified services information can be mapped to the service information of a current cell without being separately transmitted. Accordingly, there is an advantage in that the number of messages transmitted can be reduced.

Table 2 illustrates MBMS neighbor cell P-T-M RB information.

TABLE 2

Neighbor Cell P-T-M RB Informaiton

| Name | Need | Multi | Type/ Reference | Semantics description |
|---|---|---|---|---|
| Nighbor Cell List | MP | 1 . . . n | | |
| > Cell Identity | MP | | <ref> | |
| > MBMS P-T-M Rb Info | MP | 1 . . . m | <ref> | |

The MBMS neighbor cell P-T-M RB information is written on the basis of a list of neighbor cells and MBMS P-T-M RB information received from neighbor cells. The MBMS P-T-M RB information includes only information about services being serviced in a current cell. Only information about services being serviced in a current cell can be selected based on an MBMS transmission identity included in MBMS P-T-M RB information.

Table 3 illustrates MBMS modified services information.

TABLE 3

Modified Services Information

| Name | Need | Multi | Type/ Reference | Semantics description |
|---|---|---|---|---|
| modifiedServicesList | MP | 1 . . . n | | |
| > . . . | | | | |
| . . . | | | | |
| MBMS Neighbor Cell P-T-M Rb Info Modified | OP | | BOOLEN | |

The MBMS modified services information, including a factor indicating that MBMS neighbor cell P-T-M RB information has been modified, is used to represent MBMS neighbor cell P-T-M RB information modified as TRUE. A user equipment can determine whether or not to receive MBMS neighbor cell P-T-M RB information from among pieces of MBMS control information based on the information factor.

Table 4 illustrates MBMS paging information.

TABLE 4

MBMS Paging Information

| Name | Need | Multi | Type/ Reference | Semantics description |
|---|---|---|---|---|
| MBMS Paging Info | MP | 1 . . . n | | |
| > MBMS service identity | | | | |
| > MCCH ID | | | | |
| > MBMS Neighbor Cell P-T-M Rb Info Modified | OP | | BOOLEN | |

The MBMS paging information is a message, informing that MBMS control information has been modified, and is used to notify a user equipment so that the user equipment can receive MBMS control information at a next MBMS control information update cycle. The MBMS paging information is used to represent MBMS neighbor cell P-T-M RB information modified as TRUE. Accordingly, since although P-T-M RB information about services provided to a user equipment is not modified in a current cell, it can be modified in neighbor cells, the user equipment can be prepared to receive MBMS control information.

The present invention may be implemented in recording media readable by a processor in the form of codes readable by a processor. The processor-readable recording media include all kinds of recording devices in which data readable by a processor is stored. For example, the processor-readable recording media may include ROM, RAM, CD-ROM, magnetic tapes, floppy disks, optical data storages. The processor-readable recording media may be stored and executed in the form of codes, which are distributed into computer systems connected over a network and readable by a processor in a distributed manner.

While the present invention has been shown and described in connection with the exemplary embodiments thereof, those skilled in the art will appreciate that the present invention may be changed and modified in various ways without departing from the spirit and scope of the present invention as defined in the following claims.

What is claimed is:

1. An Evolved Multimedia Broadcast Multicast Service (E-MBMS) service method performed by a user equipment, the method comprising:

receiving an E-MBMS service from a first base station;

wherein, when a second base station is informed by an Evolved Packet Core (EPC) of a start, change, or termination of a session for the E-MBMS service, the second base station modifies MBMS control information for the second base station, and the second base station informs the first base station that the MBMS control information has been modified by transmitting the modified MBMS control information to the first base station;

wherein, when the first base station receives the modified MBMS control information from the second base station, the first base station modifies neighbor cell MBMS control information based on the modified MBMS control information received from the second base station;

in response to the neighbor cell MBMS control information being modified in the first base station, receiving MBMS paging information including a factor, informing that the neighbor cell MBMS control information has been modified, from the first base station;

when an MBMS control information update cycle is reached, receiving the modified neighbor cell MBMS control information from the first base station and storing the modified neighbor cell MBMS control information; and when the user equipment moves from the first base station to the second base station, resetting a P-T-M radio bearer based on the stored neighbor cell MBMS control information and receiving the E-MBMS service from the second base station.

2. The E-MBMS service method of claim 1, wherein the MBMS control information received from the second base station is configured on the basis of an MBMS transmission identity.

3. The E-MBMS service method of claim 1, wherein the neighbor cell MBMS control information modified in the first base station comprises only MBMS control information about an E-MBMS service being serviced both in a current cell and neighbor cells.

4. The E-MBMS service method of claim 1, wherein the first base station modifies MBMS control information of the first base station so that the factor, indicating that the neighbor cell MBMS control information has been modified, is included in MBMS modified services information of the first base station.

5. The E-MBMS service method of claim 4, wherein the MBMS modified services information is used to represent modification of MBMS neighbor cell P-T-M Radio Bearer (RB) information as TRUE.

6. The E-MBMS service method of claim 1, wherein the neighbor cell MBMS control information is written on the basis of a list of neighbor cells and MBMS control information received from neighbor cells.

7. The E-MBMS service method of claim 1, wherein the MBMS paging information is used to represent MBMS neighbor cell P-T-M RB information as TRUE.

* * * * *